US 9,328,847 B2

(12) United States Patent
Schiestl

(10) Patent No.: US 9,328,847 B2
(45) Date of Patent: May 3, 2016

(54) ARRANGEMENT HAVING AT LEAST ONE VALVE

(71) Applicant: VAT Holding AG, Haag (AT)

(72) Inventor: Ulrich Schiestl, Hohenems (AT)

(73) Assignee: VAT Holding AG, Haag (AT)

( * ) Notice: Subject to any disclaimer, the term of this patent is extended or adjusted under 35 U.S.C. 154(b) by 320 days.

(21) Appl. No.: 13/751,465

(22) Filed: Jan. 28, 2013

(65) Prior Publication Data

US 2013/0199628 A1  Aug. 8, 2013

(30) Foreign Application Priority Data

Feb. 1, 2012  (AT) .................................. A 137/2012

(51) Int. Cl.
 *F16K 49/00* (2006.01)
(52) U.S. Cl.
 CPC ......... *F16K 49/005* (2013.01); *Y10T 137/6579* (2015.04)
(58) Field of Classification Search
 CPC ....................... F16K 49/005; Y10T 137/6579
 USPC .............................. 137/340; 123/41.41, 41.34
 See application file for complete search history.

(56) References Cited

U.S. PATENT DOCUMENTS

| | | | | |
|---|---|---|---|---|
| 1,415,793 | A | * 5/1922 | Cattaneo | 123/41.41 |
| 2,215,390 | A | * 9/1940 | Carlson | 137/110 |
| 2,444,703 | A | * 7/1948 | Jones | 137/340 |
| 2,823,696 | A | 2/1958 | Detlefson | |
| 3,110,319 | A | 11/1963 | Arata et al. | |
| 3,710,810 | A | * 1/1973 | Shiraki et al. | 137/1 |
| 3,923,282 | A | 12/1975 | Henzler | |
| 5,474,303 | A | * 12/1995 | Coles | 277/317 |

FOREIGN PATENT DOCUMENTS

| | | |
|---|---|---|
| BE | 353346 | 9/1928 |
| DE | 942772 | 5/1956 |
| DE | 1106572 | 5/1961 |
| DE | 1500079 | 5/1969 |
| DE | 7438665 | 11/1978 |
| DE | 2366032 | 11/1983 |
| DE | 4041801 | 2/1992 |
| DE | 10024055 | 11/2001 |
| DE | 10100885 | 4/2002 |
| DE | 69814296 | 2/2004 |
| EP | 0351164 | 1/1990 |
| EP | 0911561 | 4/1999 |
| EP | 1635097 | 3/2007 |
| FR | 1089480 | 3/1955 |
| GB | 2135027 | 8/1984 |

* cited by examiner

*Primary Examiner* — John K Fristoe, Jr.
*Assistant Examiner* — Daphne M Barry
(74) *Attorney, Agent, or Firm* — Volpe and Koenig, P.C.

(57) ABSTRACT

An arrangement having at least one valve, in particular a vacuum valve, with a closure member of the valve for closing a through-opening of the valve and a drive for adjusting the closure member between a closed position, in which the closure member closes the through-opening, and at least one open position, in which the closure member opens the through-opening at least in regions. For the thermal loading of the closure member, the valve has a chamber for a heat transfer fluid, connected in a thermally conducting manner to the closure member and closed off, preferably permanently, in relation to the through-opening. A supply line of the arrangement opens into the chamber, supplying heat transfer fluid for the thermal loading of the closure member to the chamber. At least one heat exchanger for the thermal loading of the heat transfer fluid is arranged in the supply line.

14 Claims, 8 Drawing Sheets

ARRANGEMENT HAVING AT LEAST ONE VALVE

INCORPORATION BY REFERENCE

The following documents are incorporated herein by reference as if fully set forth: Austrian Patent Application No.: A 137/2012, filed Feb. 1, 2012.

BACKGROUND

The present invention relates to an arrangement with at least one valve, in particular a vacuum valve, having at least one closure member of the valve for closing at least one through-opening of the valve and at least one drive for adjusting the closure member between a closed position, in which the closure member closes the through-opening, and at least one open position, in which the closure member opens the through-opening at least in regions, wherein, for the thermal loading of the closure member, the valve has at least one chamber for at least one heat transfer fluid, said chamber being connected in a thermally conducting manner to the closure member and being closed off, preferably permanently, in relation to the through-opening, wherein at least one supply line of the arrangement opens out into the chamber, by which supply line heat transfer fluid for thermal loading of the closure member can be introduced into the chamber.

In order to be able to produce electronic components such as, for example, semiconductors, LEDs, flat screens and solar components in the quality required today, it is known to process silicon carriers, glass substrates or the like in vacuum chambers closed off by valves. The most varied development variants of valves are known in the prior art for this purpose. The valves serve, for example, for the purpose of metering media, in particular gases, flowing into the vacuum chambers or out of said vacuum chambers. However, other valves also serve as inlets or outlets through which objects to be processed, such as silicon carriers, glass substrates and the like, can be moved into the vacuum chamber or removed from said vacuum chamber. To prevent or at least to reduce deposits of contaminants or process gases on the closure members of the valves, it is often necessary to have to bring said valves up to a certain temperature. Heating is often to the fore in this connection. However, cooling the closure members of the valve can also be necessary. It is possible to provide or support the required process temperature by applying heat in a corresponding manner to the closure member. Generic arrangements where heat can be applied to the closure member by a heat transfer fluid which is brought into the noted chamber, are known in the prior art. This basic idea is already known, for example, from DE 942 772 and has also been repeated in more recent documents such as, for example, DE 698 14 296 T2.

SUMMARY

It is the object of the invention then to keep the energy requirement for the thermal loading of the closure member as low as possible by the heat transfer fluid.

To this end, the present invention provides that at least one heat exchanger for the thermal loading of the heat transfer fluid is arranged in the supply line.

Through the use of a heat exchanger for the thermal loading of the heat transfer fluid according to the invention, heat energy present in the system and/or not required at another position can be utilized for the thermal loading of the heat transfer fluid and consequently for the thermal loading of the closure member. In this connection, both heat or cold which is possibly surplus at another position, can itself be utilized within the arrangement by, for example, providing that the heat exchanger is operatively arranged between the discharge line and the supply line in order to serve the temperature exchange between the heat transfer fluid flowing out of the chamber through a discharge line of the arrangement and the heat transfer fluid flowing into the chamber through the supply line. As an alternative to this, but also in combination therewith, heat energy from other systems can also be transferred to the arrangement and in particular to the heat transfer fluid in the supply line. In this connection, preferred embodiments of the invention provide that the heat exchanger is operatively arranged between the supply line and another heat transfer fluid system in order to serve the temperature exchange between the heat transfer fluid flowing into the chamber through the supply line and another heat transfer fluid. It is particularly favorable in this context when the other heat transfer fluid system is a heating and/or cooling arrangement for applying heat to a housing of the valve encasing the closure member and the through-opening. The thermal loading can be both heating and cooling. Suitable heat transfer fluids can be both liquid and gaseous. For example, air, nitrogen, vapor, $CO_2$, where applicable filtered flue gases but also nitrous oxide can be used as gaseous heat transfer fluids. Various halogenated hydrocarbons (FCKW's) such as, for example, R134A (tetrafluoroethane), R11, R14 and R22 can be used as refrigerants. Nitrogen, helium, methane, ammonia as well as various volatile hydrocarbons are conceivable as gases with a particularly high thermal capacity, to name here but a few.

In a particularly preferred manner, the valves of the arrangement are so-called vacuum valves which are used in vacuum technology. From pressures in the operating state less than or equal to 0.001 millibar or 0.1 Pascal is said to be vacuum technology. Vacuum valves are suitable and provided to be used at negative pressures for this order of magnitude and below. Naturally, the invention can also be applied with arrangements with valves which are used in another area.

Valves as claimed in the invention can be used for media metering or, in particular, for gas metering. The valves of the arrangement as claimed in the invention can, however, also serve for inserting workpieces to be processed right through them into the vacuum chamber and/or to remove said workpieces from said vacuum chamber. In a corresponding manner, the closure members of the valves of the arrangement as claimed in the invention can be so-called valve disks but also sliders, in particular wedge-shaped sliders to name but the most common embodiments of closure members. The through-opening is the opening of the valve which can be closed and opened by the closure member. The gases or media to be metered flow through the through-opening or the workpieces to be processed can be introduced into the vacuum chamber or removed from said vacuum chamber through the through-opening. The choice of a suitable drive for moving the closure member depends on the type of closure member. There are numerous different suitable drives available in the prior art, for example of the hydraulic, pneumatic and/or electric type, from which a choice can be made also when implementing the invention. The chamber, into which the heat transfer fluid is introduced in order to heat the closure member, is closed off in relation to the through-opening, in a favorable manner permanently. The heat transfer fluid in the noted chamber is therefore not the media which are to be metered through the through-opening by the closure member or closed off. The heat transfer fluid serves essentially to heat and/or to cool the closure member right through the chamber wall. The heat exchanger for applying the heat to the heat transfer fluid is situated outside a housing of the valve in preferred embodiments.

For the fine adjustment of the temperature of the closure member or for cases in which the heat exchanger is not able to make sufficient heat or cold available, preferred embodiments provide that in addition to the heat exchanger at least one, preferably controllable, heating and/or cooling device is arranged in the supply line for applying heat to the heat transfer fluid. With the, preferably controllable, heating and/or cooling device the temperature of the heat transfer fluid set by the heat exchanger can then be controlled to a precisely required value, in particular before the heat transfer fluid flows into the chamber. The temperature of the heat transfer fluid before flowing into the chamber can be used, for example, as a controlled variable for the heating and/or cooling device. As an alternative to this, a temperature in the heat exchanger or at another suitable position can also be used, for example, as a controlled variable.

It is possible to utilize pressures and/or driving possibilities that are already present in the system for the conveying of the heat transfer fluid into the chamber and out of said chamber. However, in addition to the heat exchanger, the arrangement can also have at least one pump or at least one blower for conveying the heat transfer fluid, in particular in the supply line. Both the pump and the blower, in turn, can be controllable. This control can be carried out, for example, once again in dependence on the above-mentioned temperature values. However, in addition or as an alternative to this, the speed of progress or the volume flow of the heat transfer fluid in the supply line or at another position can be measured as a controlled variable. In a favorable manner, the control of the pump and/or of the blower is coupled to the control of the heating and/or cooling device.

As claimed in a second aspect of the invention, which can be realized in combination with the heat exchanger but also independently thereof, it can be provided that the chamber, the supply line and a discharge line of the arrangement for heat transfer fluid flowing out of the chamber form a heat transfer fluid circuit which is closed per se or part of such a circuit. This is suitable above all when volatile gases and/or liquids are used as heat transfer fluid. The heat or cold in the circuit is also kept and used in a particularly effective manner by the circuit that is closed per se, as a result of which the energy requirement for the thermal loading of the closure member is also kept very low. However, deviating from this, open systems are also possible where the heat transfer fluid is not guided in a circuit that is closed per se.

Preferred embodiments provide that the chamber is defined at least in regions by the closure member and by a bellows or a, preferably telescopic, sliding sleeve. In a favorable manner, the valve has at least one valve seat, against which the closure member abuts in its closed position. Once again in a favorable manner, the chamber is arranged on a side of the closure member remote from the valve seat. The valve of arrangements as claimed in the invention can be realized both as a corner valve and as a sliding valve, to name but a few examples.

BRIEF DESCRIPTION OF THE DRAWINGS

Further features and details of different embodiments of arrangements as claimed in the invention are explained as an example by way of the following description of the figures, in which:

DETAILED DESCRIPTION OF THE PREFERRED EMBODIMENT

Figure 1:
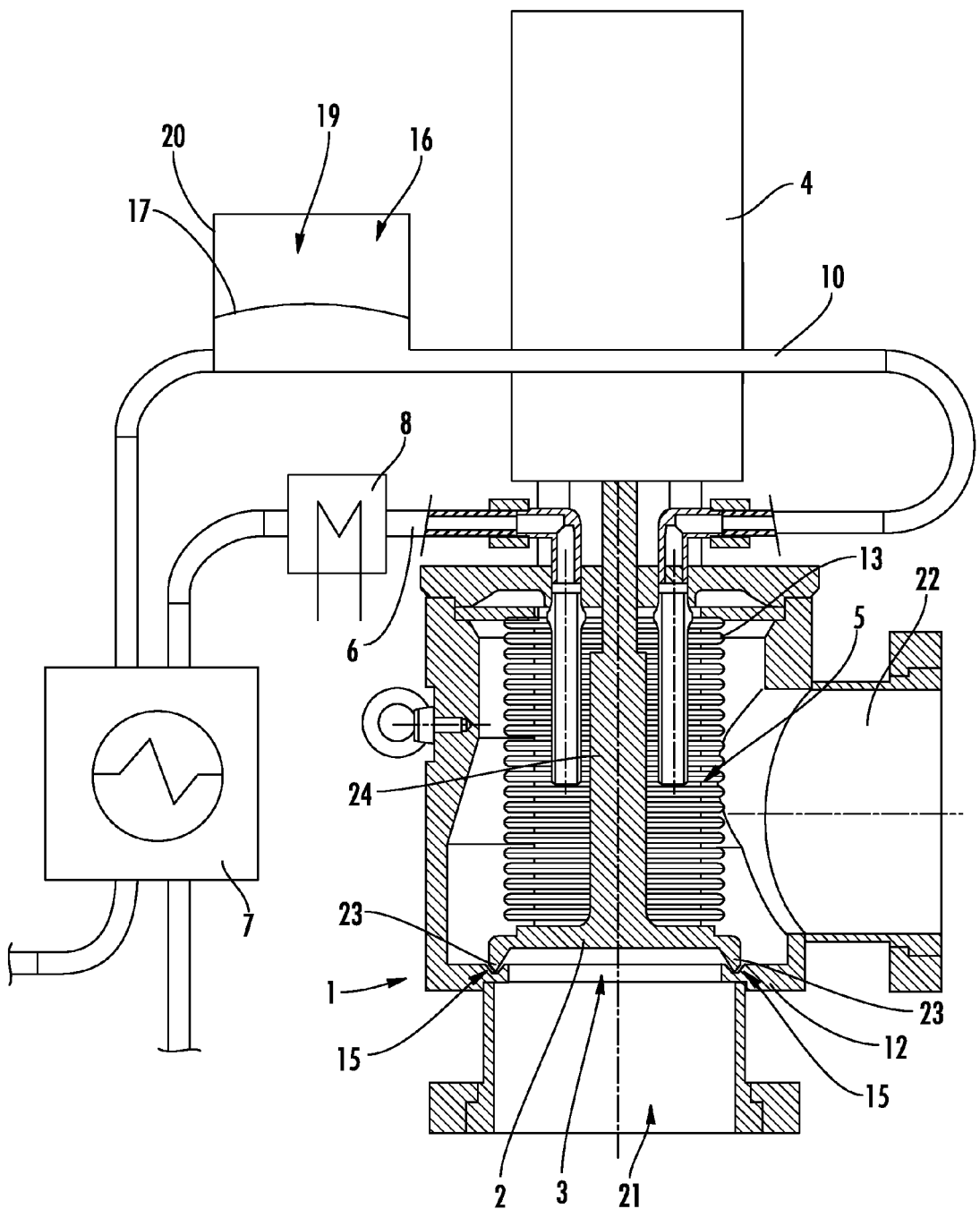
FIGS. 1 and 2 show a first exemplary embodiment as claimed in the invention.
Figure 2:
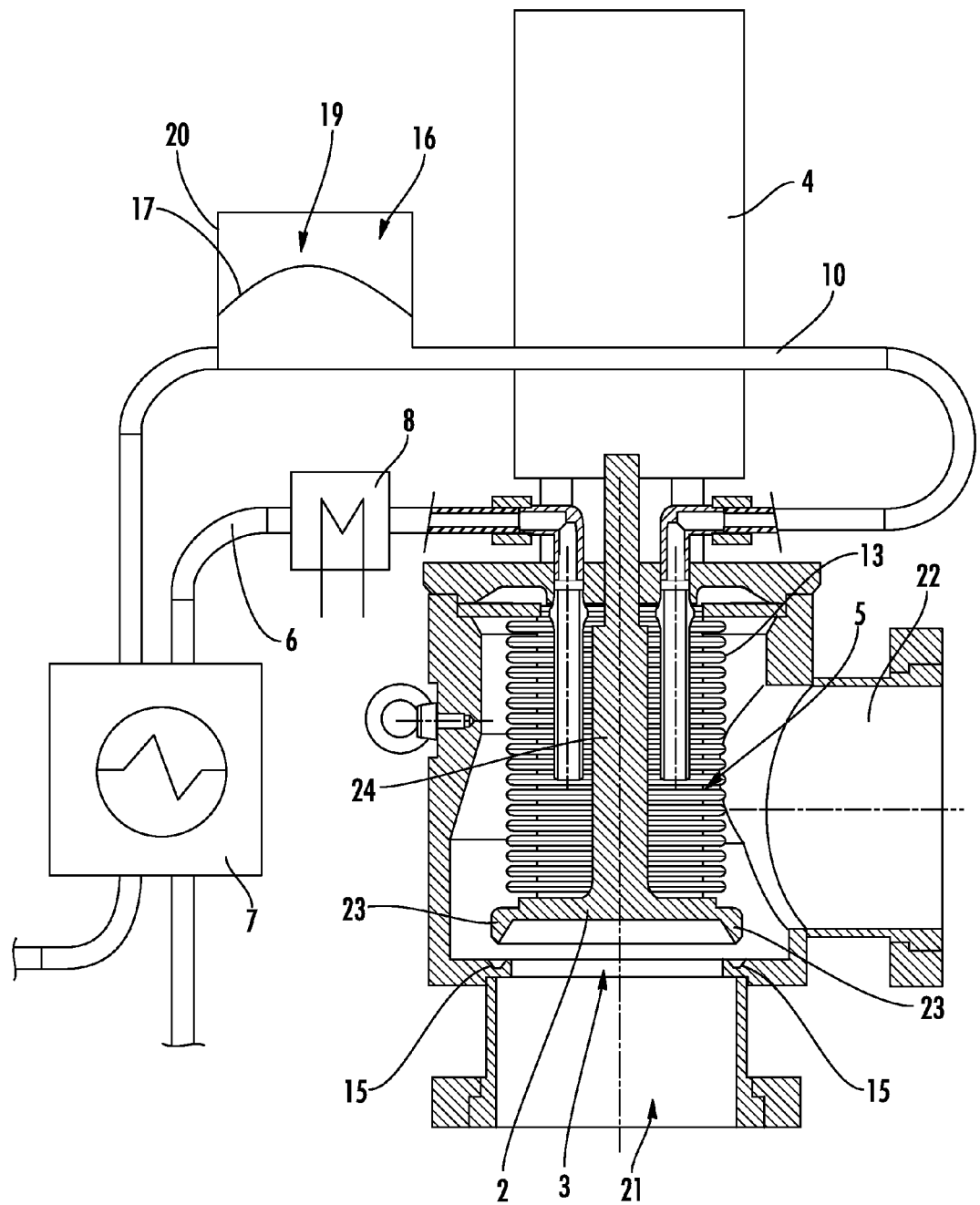

The exemplary embodiments according to FIGS. 1 to 5 are so-called corner valves which are used first and foremost for metering gaseous or liquid media such as, for example, process gases. In the case of the first exemplary embodiment of the invention according to FIGS. 1 and 2, FIG. 1 shows the closure member 2 in its closed position, in which it closes the through-opening 3 of the valve 1 completely. FIG. 2 shows the maximum open position, in which the closure member 2 opens the through-opening 3 and a gas or a liquid is able to flow into the valve inlet 21 and past the closure member 2 out of the valve outlet 22 again, or vice versa. To move between its closed position and the open position or the different open positions, the closure member 2, which is realized as a valve disk in said first exemplary embodiments, is connected to a drive 4 (not shown here in any more detail) by the valve rod 24. The drive 4 is responsible for lifting and lowering the valve rod 24 together with the closure member 2. The drive can be of the most varied embodiments of suitable drives 4 known per se in the prior art, for example of the hydraulic, electric or pneumatic type.

In the exemplary embodiment according to FIGS. 1 to 5, the closure member 2 is in each case a so-called control disk which engages by way of a ring-shaped projection 23 in a correspondingly corresponding ring-shaped groove of the valve seat 15 in the closed position. This specific embodiment of the closure member 2 of the valve 1 has been chosen so that during the opening operation, proceeding from the closed position, the full volume flow does not occur immediately, but rather during the opening operation, with the maximum pressure difference still present at the start, only a small volume flow is possible first of all. Proceeding from the closed position according to FIG. 1, when the closure member 2 is lifted from the valve seat 15, first of all overflow openings with a relatively small cross sectional opening are created as the medium to be metered flowing into the valve inlet 21 first of all has to flow through the groove-shaped recess in the valve seat 15 and around the projections 23 of the valve disk such that the volume flow at the start of the opening operation is initially very small. In addition, through the design, shown here as an example, of correspondingly formed projections 23 in the closure member 2 and recesses in the valve seat 15, at the start of the opening the flow path between the valve seat and the closure member is lengthened, which, in turn, contributes to a throttling of the volume flow. Naturally, this basic idea can also be realized in other forms and development variants of projections and recesses in the closure member and the valve seat 15. In particular in this connection, it is favorable when, in this connection, obliquely arranged wall portions are realized which are arranged at an angle deviating from 0° and 90° as well as multiples thereof with respect to the opening and/or closing direction of the closure member 2.

However, arrangements as claimed in the invention can also be realized where this control disk technology is not used, but rather the closure member 2 and the valve seat 15 are realized in other embodiments known in the prior art.

To heat and/or, however, also to cool the closure member 2, the chamber 5, which is defined by the closure member 2 and by the bellows 13, can be filled with heat transfer fluids. The heat transfer fluid flows into the chamber 5 by the supply line 6. It flows out by the discharge line 10. In order to bring the heat transfer fluid in the supply line 6 as claimed in the invention to the correct temperature, that is to heat or to cool it, the heat exchanger 7 is arranged in the supply line 6. I.e. the heat transfer fluid in the supply line 6 flows through the heat exchanger 7 and at the same time heat is applied to it. The heat transfer fluid can be both cooled and heated. In the exemplary embodiment shown, the heating and/or cooling device 8 is connected downstream of the heat exchanger 7 in the supply line 6. Said device, in this exemplary embodiment, serves first and foremost for the fine adjustment of the temperature of the heat transfer fluid flowing into the chamber 5 through the supply line 6. In a favorable manner, the heating and or cooling device is provided with a control means which is known per se and actuates the heating and/or cooling device 8 in a suitable manner in dependence on a suitable parameter such as, for example, the temperature of the heat transfer fluid in the supply line 6.

In the first exemplary embodiment according to FIGS. 1 and 2, the supply line 6 and the discharge line 10 are connected to a larger circuit of the heat transfer fluid (not shown in any more detail here). The system pressure or another manner of conveying the heat transfer medium in the named lines is provided in another way in a manner not explained explicitly here.

In particular in the case of liquid heat transfer media, as shown here in a schematic manner to complete the picture, a volume equalizing device 16 can be present which serves to equalize the inside volume of the chamber 5 which alters when the closure member 2 is opened and closed. Such a volume equalizing device 16 can always be provided when an otherwise present circuit is not able to equalize said change in volume. In particular in the case of open circuits and/or in the case of compressible gaseous heat transfer fluids, it can also be possible, where applicable, to dispense with such a volume equalizing device 16 entirely. In the exemplary embodiment shown of the volume equalizing device, there is a schematic representation of a cylinder 20 in which a gas volume 19 is locked by the diaphragm 17. On the side of the diaphragm 17 remote from the gas volume 19 in this exemplary embodiment, said diaphragm communicates with the heat transfer fluid in the discharge line 10 such that a reduction in the chamber volume in the chamber 5 can be equalized by an increase in the volume underneath the diaphragm 17 in the cylinder 20 by compressing the locked-in gas volume 19 and vice versa. The volume equalizing device 16 shown here is only a schematically represented example, it can be realized in the most varied embodiments known in the prior art and as already noted, where applicable can also be omitted entirely.

Figure 3:
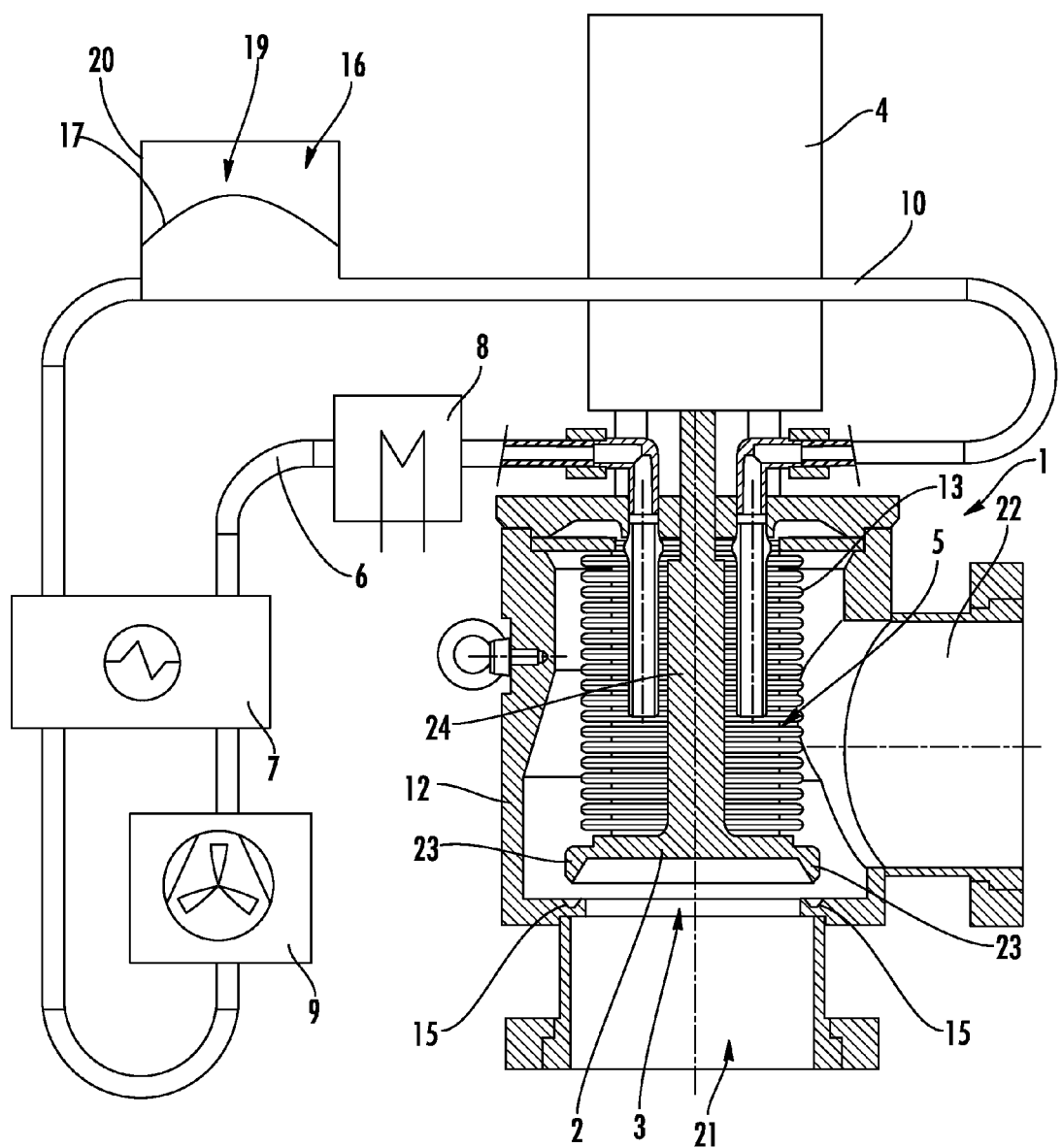
FIGS. 3, 4 and 5 show modifications as claimed in the invention of said first exemplary embodiment.
Figure 4:
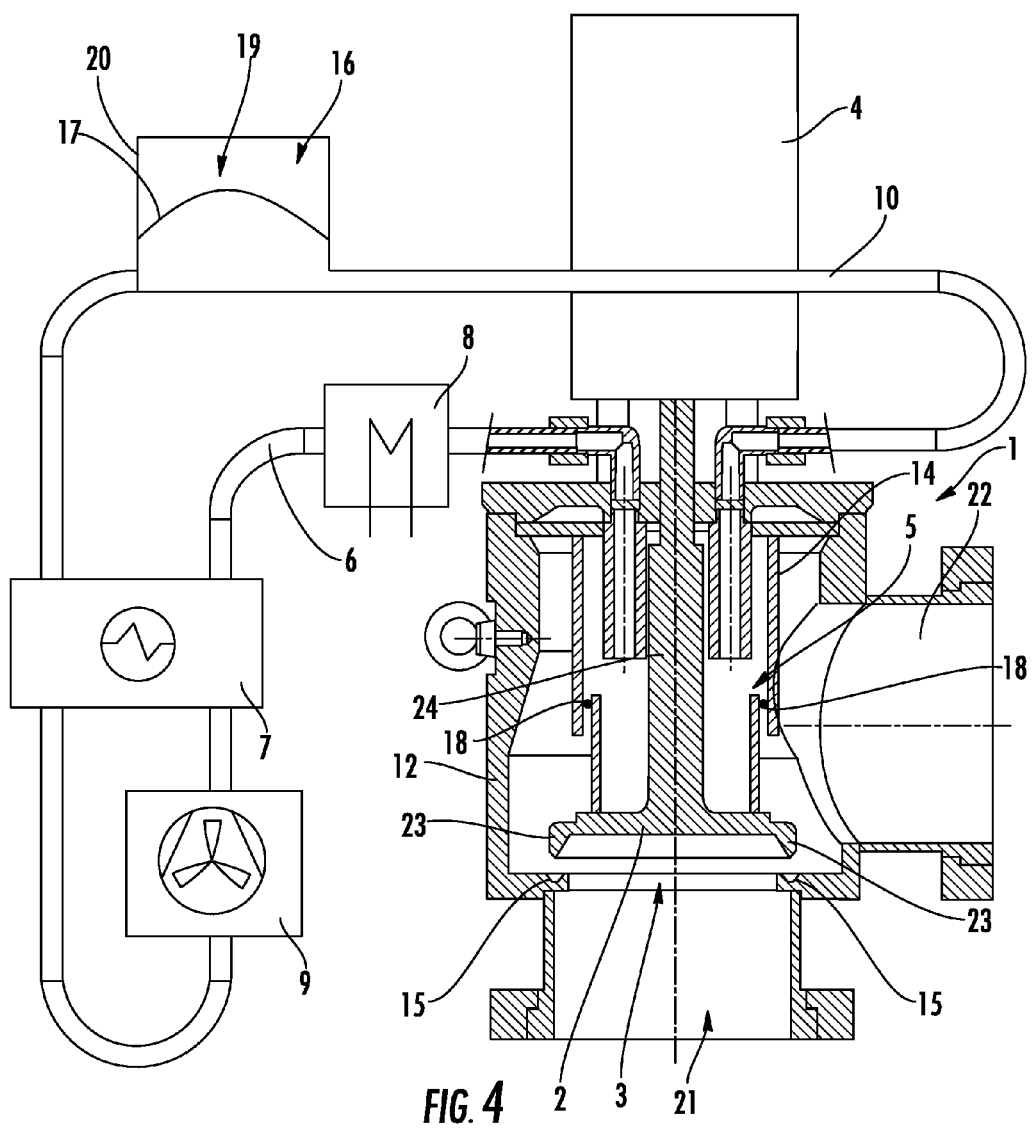

The second exemplary embodiment according to FIG. 3 is basically constructed in a similar manner to the first exemplary embodiment according to FIGS. 1 and 2 such that only the differences will be discussed here. Everything else can be realized corresponding to the previous description of FIGS. 1 and 2 or can also be varied.

The variant according to FIG. 3 is an exemplary embodiment of an arrangement as claimed in the invention, where the chamber 5, the supply line 6 and the discharge line 10 form a heat transfer fluid circuit which is closed per se. The heat exchanger 7 removes heat or cold from the heat transfer fluid in the discharge line 10 and transfers this to the heat transfer fluid in the supply line 6. This is, for example, sensible when the lines on the side of the heat exchanger 7 remote from the valve 1 are very long and consequently susceptible to losses. For conveying the heat transfer fluid through the supply line 6, the chamber 5 and the discharge line 10, a blower 9 is provided in the exemplary embodiment shown according to FIG. 3. This embodiment is one such which is provided for the use of gaseous heat transfer fluids. If the heat transfer fluid is a liquid, the blower 9 can be replaced by a corresponding pump.

Figure 8:
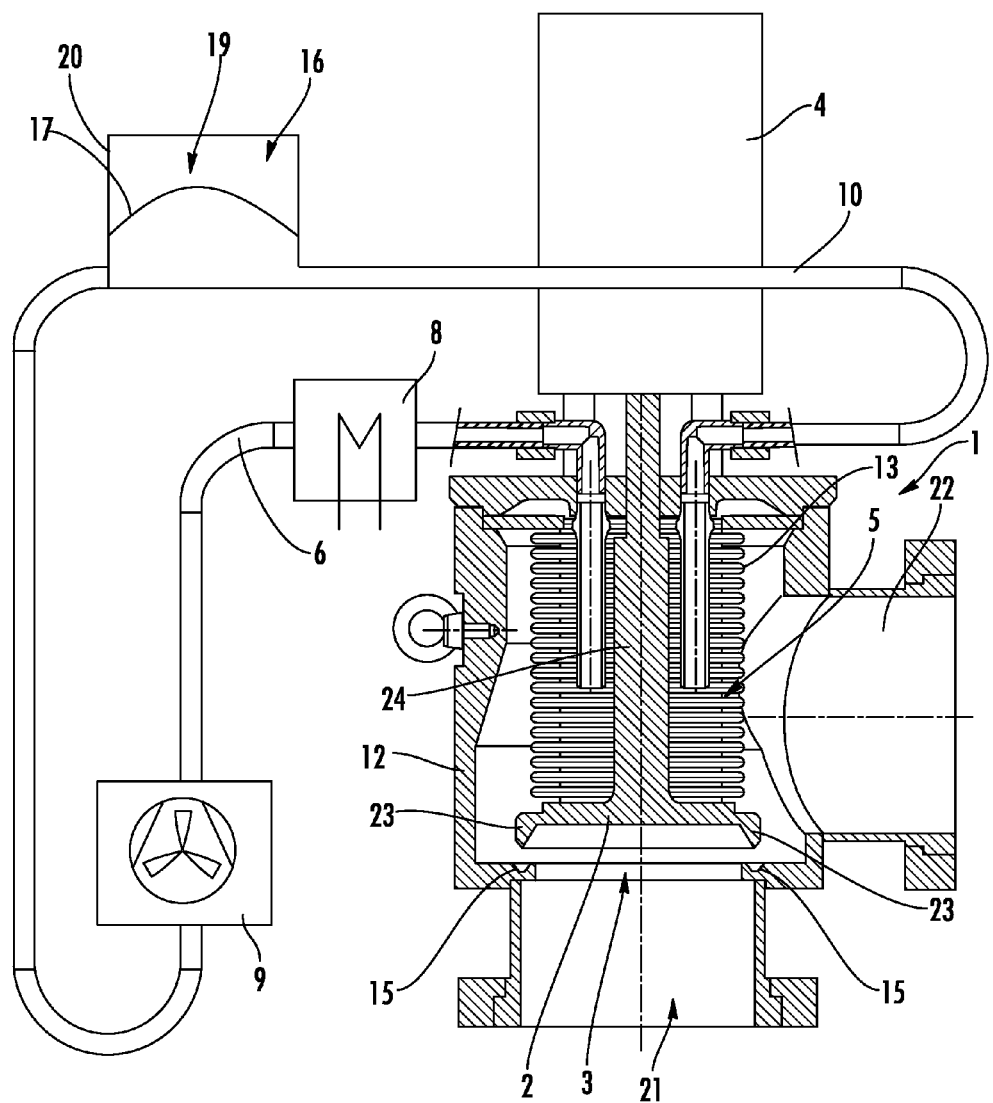
FIG. 8 shows an exemplary embodiment as claimed in the invention according to the second aspect of the invention.

FIG. 8 shows an exemplary embodiment modified according to the second aspect of the invention which does not have a heat exchanger 7 but does have the named closed heat transfer fluid circuit. This exemplary embodiment is otherwise realized as FIG. 3 such that additional descriptions of said variants are superfluous. These variants are suitable above all for saving energy when the heat transfer fluid circuit can be kept relatively short. Naturally, other closed heat transfer fluid circuits of the variants shown definitively here according to the second aspect of the invention can also be realized without a heat exchanger 7.

The exemplary embodiment according to FIG. 4 is once again a modification of the exemplary embodiment according to FIG. 3 such that essentially reference can be made to features that have been given beforehand. The difference to FIG. 3 is in the manner the chamber 5 is defined. In place of the bellows 13 from FIG. 3, in this exemplary embodiment a sliding sleeve 14 is provided which defines and seals off the chamber 5 toward the outside in a telescopic manner per se and in common with the closure member 2. The seals 18 seal the regions of the sliding sleeve 14, which are displaceable toward each other, in relation to each other such that the heat transfer fluid is not able to flow out.

Figure 5:
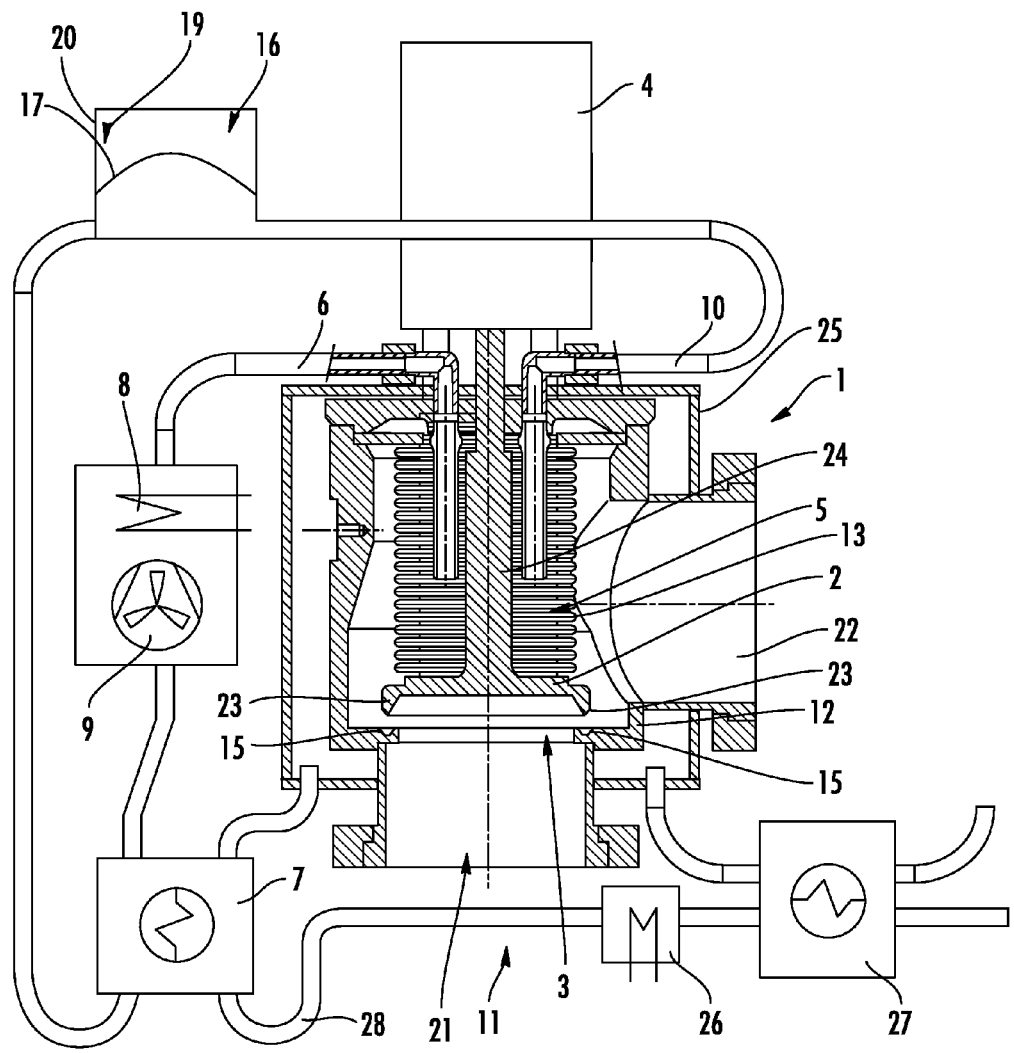

In the case of the variant shown in FIG. 5, the heat exchanger 7 is operatively arranged for the temperature exchange between the heat transfer fluid flowing into the chamber 5 through the supply line 6 and another heat transfer fluid system. The other heat transfer fluid system, in the exemplary embodiment according to FIG. 5, is a heating and/or cooling arrangement 11 for applying heat to the housing 12 of the valve 1, which encases the closure member 2 and the through-opening 3. The casing, in this exemplary embodiment, is realized by the outer surface 25. Heat transfer fluid can be introduced in the space between the outer surface 25 and the housing 12 of the valve 1 by the heating and/or cooling arrangement 11, as a result of which a targeted cooling and/or heating of the housing 12 of the valve 1 from outside is possible. In the shown exemplary embodiment, the heating and/or cooling arrangement 11 provides a heating and/or cooling device 26 and a heat exchanger 27 for this purpose. In a favorable manner, the heating and/or cooling device 26 is once again controlled, once again temperatures in the heating and/or cooling arrangement 11 being able to be measured at a suitable position as control parameters, to name one example. A line 28 of the heating and/or cooling arrangement 11 comes from the heating and/or cooling device 26 and passes right through the heat exchanger 7. Heat and/or cold can be removed from said line or from the heat transfer fluid flowing therein in order to heat and/or to cool the heat transfer fluid in the supply line 6. In the exemplary embodiment shown, a combined device from a heating and/or cooling device 8 and a blower 9 is then provided connecting to the heat exchanger 7, by which combined device the volume flow of the heat transfer fluid in the supply line 6 and the fine adjustment of the temperature thereof can then be undertaken.

Figure 6:
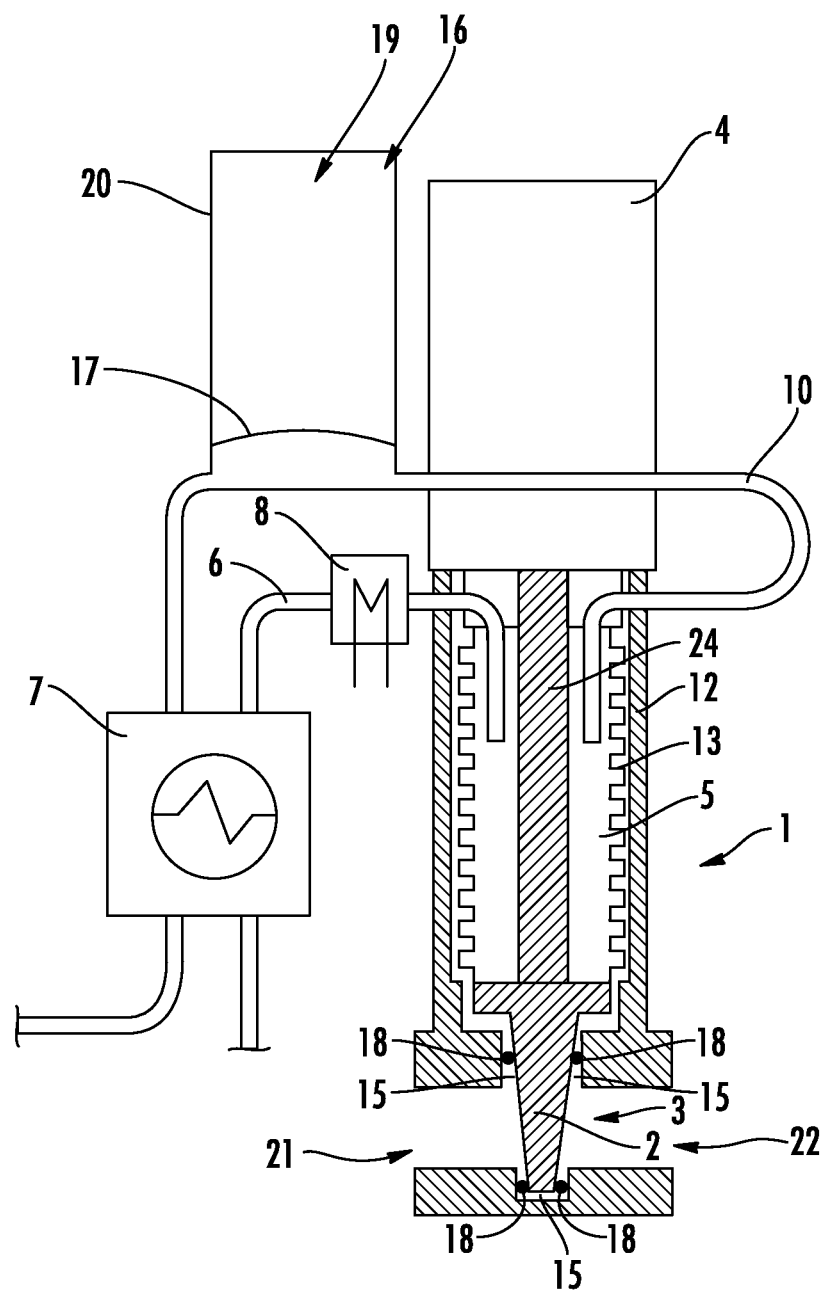
FIGS. 6 and 7 show further exemplary embodiments as claimed in the invention.
Figure 7:
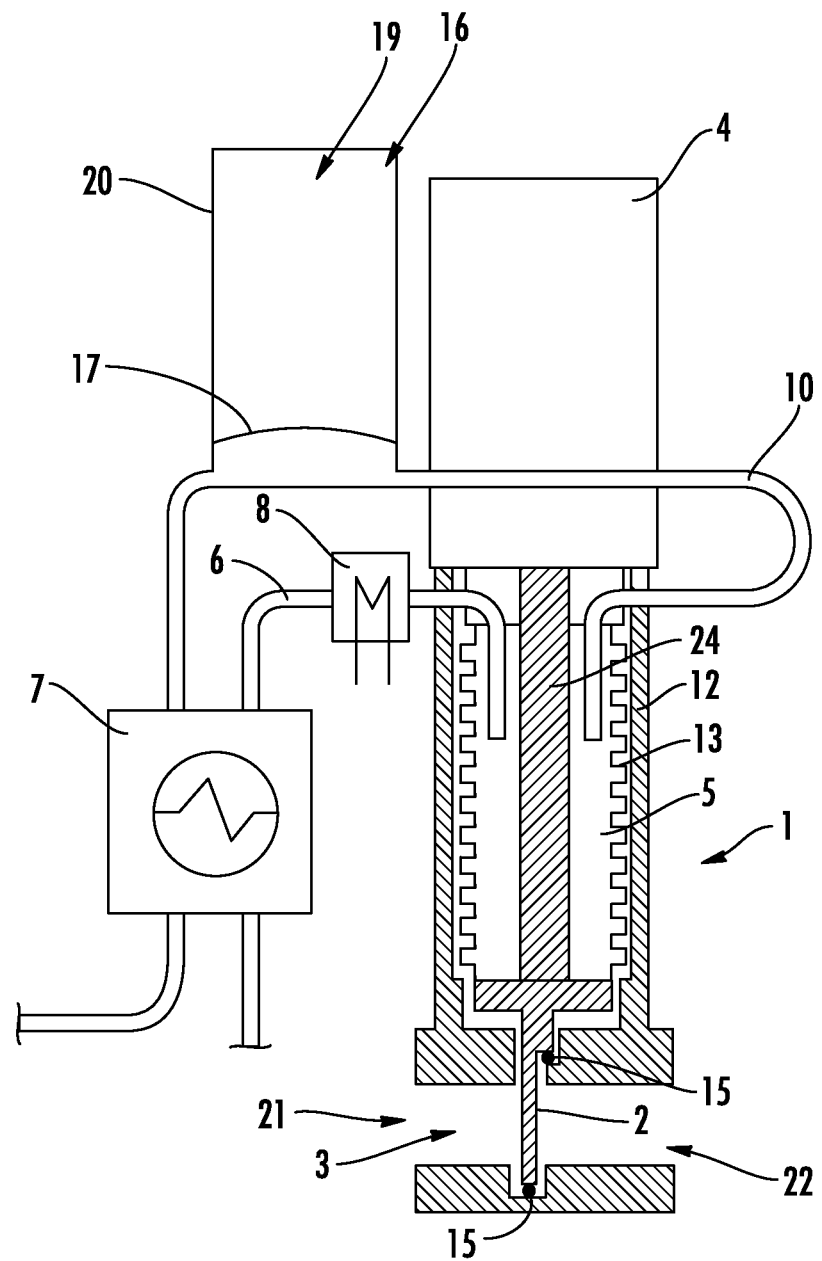

All the exemplary embodiments as claimed in the invention depicted up to now are so-called corner valves. To complete the picture, FIGS. 6 and 7 show schematic representations of examples where the closure member 2 is realized as a slider, that is arrangements with sliding valves provided as claimed in the invention. In FIG. 6, there is a wedge-shaped slider as a closure member 2 which, in its closed position shown in FIG. 6, is sealed off from the corresponding valve seats 15 by the seals 18. In the open position, which is not shown here, the closure member 2 is moved upward such that the through-opening 3 is free or at least free in regions. Such sliding valves can be used then above all when it is a question of creating a closable opening in a process chamber or vacuum chamber, through which the objects to be processed can be inserted into the vacuum chamber or process chamber or can be removed from the same. The thermal loading of the closure member 2 by the heat transfer fluid in the chamber 5 and in particular the thermal loading as claimed in the invention to the heat transfer fluid by the heat exchanger 7 is realized as an example as in the first exemplary embodiment and consequently does not need to be explained any further. Naturally, another form of the embodiment of the heating of the closure member as claimed in the invention can also be realized in the case of sliding valves, as is shown in the other exemplary embodiments or is possible in other variants of the invention not shown here. The closure member 2 is not wedge-shaped in FIG. 7 and the seals 18 and valve seats 15 are adapted in a corresponding manner. Deviating from the exemplary embodiments shown here, it can also be a question of closure members 2 which perform an L-shaped movement during the opening and/or closing operation. Such closure members 2 are sufficiently known in the prior art such that they do not have to be described in detail here.

KEY TO THE REFERENCE NUMERALS

1 Valve
2 Closure member
3 Through-opening
4 Drive
5 Chamber
6 Supply line
7 Heat exchanger
8 Heating and/or cooling device
9 Blower
10 Discharge line
11 Heating and/or cooling arrangement
12 Housing
13 Bellows
14 Sliding sleeve
15 Valve seat
16 Volume equalizing device
17 Diaphragm
18 Seal
19 Gas volume
20 Cylinder
21 Valve inlet
22 Valve outlet
23 Projection
24 Valve rod
25 Outer surface
26 Heating and/or cooling device
27 Heat exchanger
28 Line

The invention claimed is:

1. An arrangement comprising:
at least one valve having at least one closure member for closing at least one through-opening of the valve, and at least one drive for adjusting the closure member between a closed position, in which the closure member closes the through-opening, and at least one open position, in which the closure member opens the through-opening at least in regions,
wherein, for thermal loading of the closure member, the at least one valve has at least one chamber for a heat transfer fluid, said chamber being connected in a thermally conducting manner to the closure member and being closed off in relation to the through-opening,
at least one supply line opens out into the chamber, said supply line supplying the heat transfer fluid into the chamber for thermal loading of the closure member, at least one heat exchanger for the thermal loading of the heat transfer fluid arranged in the supply line,
the heat exchanger is operatively arranged between a discharge line and the supply line, and
the supply line and the discharge line pass into the heat exchanger which removes heat or cold from the heat transfer fluid in the discharge line and transfers it to the heat transfer fluid in the supply line.

2. The arrangement as claimed in claim 1, wherein in addition to the heat exchanger, at least one of a heating or cooling device is arranged in the supply line for the thermal loading of the heat transfer fluid.

3. The arrangement as claimed in claim 2, wherein the at least one of the heating or cooling device is controllable.

4. The arrangement as claimed in claim 1, wherein in addition to the heat exchanger at least one pump or at least one blower is arranged in the supply line for conveying the heat transfer fluid.

5. The arrangement as claimed in claim 4, wherein the at least one pump or the at least one blower is controllable.

6. The arrangement as claimed in claim 1, wherein the chamber, the supply line, and the discharge line of the arrangement for the heat transfer fluid flowing out of the chamber form a heat transfer fluid circuit which is closed per se or form part of said heat transfer fluid circuit.

7. The arrangement as claimed in claim 6, wherein the chamber is defined at least in regions by the closure member and by a bellows or a sliding sleeve.

8. The arrangement as claimed in claim 7, wherein the valve has at least one valve seat, against which the closure member abuts in the closed position, and the chamber is arranged on a side of the closure member remote from the valve seat.

9. The arrangement as claimed in claim 6, wherein the valve is a corner valve or a sliding valve.

10. The arrangement as claimed in claim 6, wherein the valve is a vacuum valve.

11. The arrangement as claimed in claim 1, wherein the at least one chamber is permanently closed off from the through-opening.

12. The arrangement as claimed in claim 1, wherein the valve is a corner valve or a sliding valve.

13. The arrangement as claimed in claim 1, wherein the valve is a vacuum valve.

14. The arrangement as claimed in claim 1, wherein the valve has at least one valve seat, against which the closure member abuts in the closed position, and the chamber is arranged on a side of the closure member remote from the valve seat.

* * * * *